United States Patent

[11] 3,543,667

| [72] | Inventor | Reinhard Sobotta<br>Braunschweig, Germany |
|---|---|---|
| [21] | Appl. No. | 739,884 |
| [22] | Filed | June 25, 1968 |
| [45] | Patented | Dec. 1, 1970 |
| [73] | Assignee | Rollei-Werke Franke & Heidecke<br>Braunschweig, Germany<br>a firm of Germany |
| [32] | Priority | July 12, 1967 |
| [33] | | Germany |
| [31] | | No. R46456 |

[54] PHOTOGRAPHIC CAMERA
7 Claims, 1 Drawing Fig.

[52] U.S. Cl. .................................................. 95/45;
350/44, 350/187
[51] Int. Cl. ........................................................ G03b 3/00
[50] Field of Search ............................................ 95/45;
350/44, 187

[56] References Cited
UNITED STATES PATENTS

| 2,245,212 | 6/1941 | Mihalyi et al. ................ | 95/45 |
| 2,896,524 | 7/1959 | Warzybok et al. ............. | 95/45 |
| 3,095,794 | 7/1963 | Raab ............................. | 95/45 |
| 3,119,891 | 1/1964 | Ferrari et al. ................. | 95/45X |

FOREIGN PATENTS

| 1,267,080 | 4/1968 | Germany ...................... | 95/45 |

Primary Examiner—John M. Horan
Assistant Examiner—Richard M. Sheer
Attorney—Stonebraker and Shepard ABSTRACT: A camera has a lens movable backwardly and forwardly for focusing by a rotary focusing knob which turns more than one complete revolution to cover the entire range of focusing movement. A stop member engages a projection on the focusing knob or on some part turning therewith to limit the rotation of the focusing knob in at least one direction and to determine at least one of its limit positions. Since the focusing knob must turn through more than one complete revolution in order to cover the entire focusing range, the stop member is out of the path of travel of the projection associated with the focusing knob during all but the last part of the movement of the focusing knob in the direction which is to be limited. As the knob approaches its limit position, a cam moves the stop member into effective position ready to limit the rotation of the knob at the desired point.

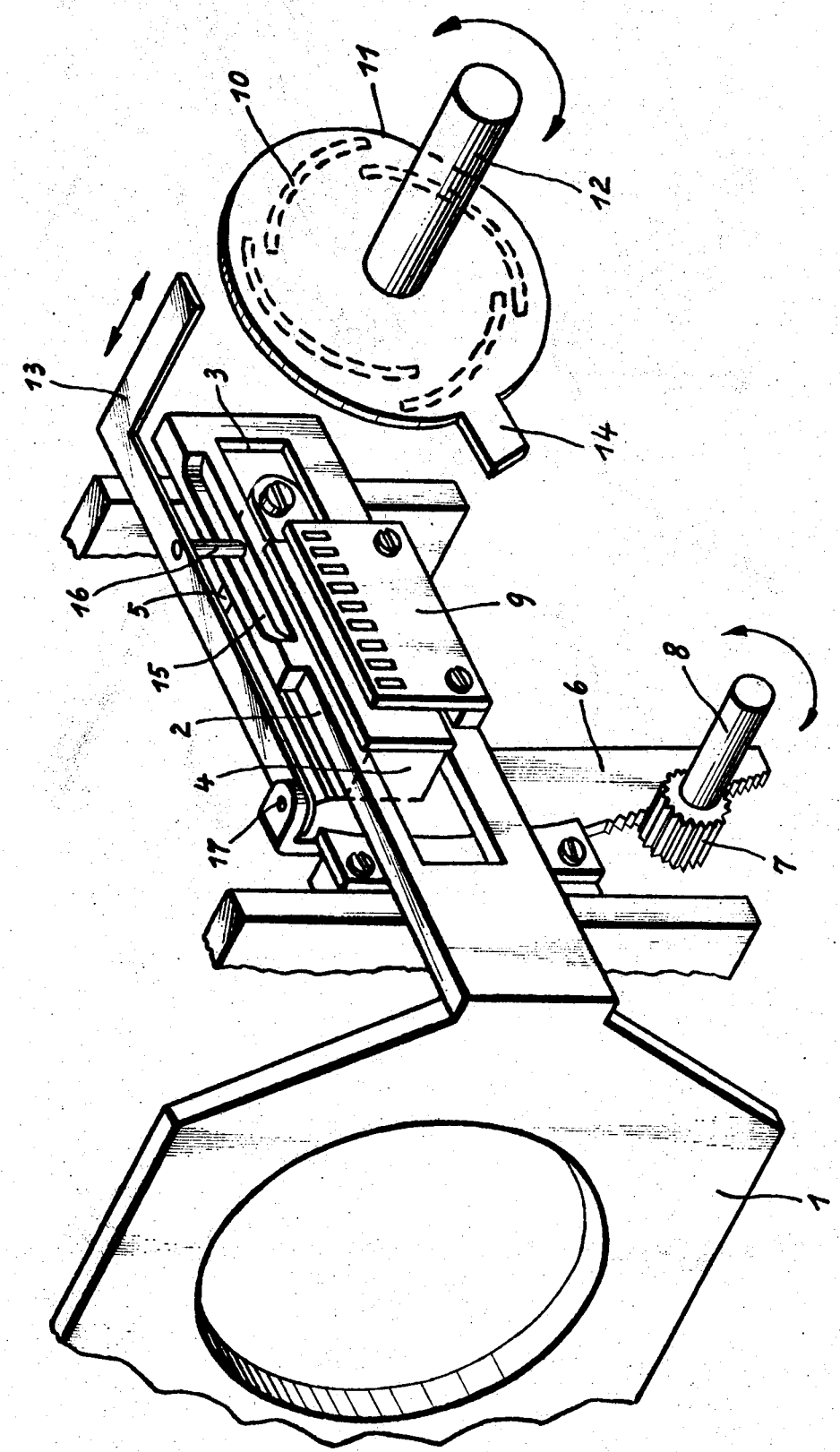

PHOTOGRAPHIC CAMERA

BACKGROUND OF THE INVENTION

The invention relates to a photographic camera of the focusing type, wherein the lens (using this word broadly as including a lens system or assembly, or a single individual lens component, as the case may be) is mounted on a carrier movable forwardly and backwardly in the direction of the optical axis. In addition to the forward and backward focusing movement, the lens carrier may also be mounted for tilting movement upwardly and downwardly, as disclosed for example in the copending U.S. Pat. application of Prochnow and Weiss, Ser. No. 667,800, filed Sept. 14, 1967, now Pat. No. 3,507,200 and owned by the owner of the present application. As a convenient example, the present invention is disclosed in connection with a lens carrier which does have such upward and downward tilting movement, as in said prior application, and so may be considered as an improvement on the construction disclosed in said prior application. However, such upward and downward tilting is not an essential part of the present invention, and the present invention is useful also in connection with lens carriers which have merely the forward and backward focusing movement, without having also the upward and downward tilting movement.

For ease of accurate and fine focusing, it is desirable to have the forward and backward movement of the lens carrier controlled by a focusing knob, and for greatest accuracy of fine adjustment, particularly when there is a considerable range of forward and backward focusing movement, it is desirable to construct the mechanism so that the focusing knob must turn more than one complete revolution (e.g., a plurality of revolutions) in order to cover the entire focusing range from infinity position to extreme closeup position. Also it is found desirable to have at least the infinity focus position, and possibly also the extreme closeup limit position, determined by stop means which stops the turning motion of the focusing knob at the proper place, rather than stop means which contacts directly with the lens carrier. In cameras where the focusing knob turns not more than one complete revolution of 360°, in order to cover the entire focusing range, there is no particular problem in providing a stop which will limit the rotation of the focusing knob at one or both ends of its intended range. However, when the focusing knob must turn more than one complete revolution, a simple fixed stop cannot be used, because it would interfere with rotation of the knob through a previous revolution, prior to the final revolution approaching the limit position. The present invention is directed to this problem of stopping the rotation of the focusing knob at the appropriate place during its final revolution, without interfering with previous revolutions of the knob.

An object of the present invention is the provision of a generally improved and more satisfactory limiting means or stop means for limiting the focusing movement of the lens mount at least at one end or possibly at both ends of its range of travel.

Another object of the invention is the provision of inexpensive and sturdy mechanism, easily constructed, for appropriately limiting the rotation of the focusing knob during its final revolution, without interfering with rotation through previous revolutions.

Still another object is the provision of a simple and inexpensive form of stop member, arranged to cooperate with a projection turning with the focusing knob, which stop member is movable under the control of a cam which moves with the focusing movement of the lens mount, so that the stop member is out of the path of travel of the projection on the focusing knob during the preliminary revolution or revolutions of the focusing knob, and comes into position for engaging the projection on the focusing knob, only during the last revolution of the knob, near the end of the range of focusing movement.

BRIEF DESCRIPTION OF THE DRAWING

In the accompanying drawing which is incorporated herein by reference and which constitutes a material part of the present disclosure, the single view is an exploded perspective view, with parts broken away, of a lens carrier and its guide rails and associated parts, illustrating a preferred embodiment of the present invention.

DESCRIPTION OF THE PREFERRED EMBODIMENT

Except for the parts herein specifically mentioned, the rest of the camera may be of conventional and well-known construction commonly found in small hand cameras. The main features of such a camera, being well known, are not shown in the drawing and will, of course, be well understood by those skilled in the art. The camera includes the usual light-tight body, at the forward end of which is mounted a lens carrier 1, equipped with the usual lens, not shown. At both sides of the carrier 1, side rails 2 extend rearwardly, but only one rail on one side of the carrier is illustrated, since the rails and associated mechanism on the two sides of the carrier are reverse duplicates of each other, and a description of the mechanism at one side will serve for both.

Each side rail 2 of the carrier is longitudinally slotted at 3, and the edges of the slot have snug sliding fit with guide slots in a slide rail or slide block 4 pivotally mounted for upward and downward swinging movement on a journal or pivot 5 which extends transversely with respect to the optical axis, intersecting the optical axis perpendicular thereto. The pivotal axis 5 is preferably in or as close as possible to the film plane.

The pivoted slide rails or blocks 4 are provided with external handle means accessible from the outside of the camera body, for swinging these guide rails on their pivots 5 in order to raise or lower the lens carrier 1. Various handle arrangements are possible. One convenient arrangement is to provide each slide rail or block 4 with an arcuate gear segment 6 having rack teeth formed along a curved edge which is concentric with the pivotal axis 5. The gear teeth on the segments 6 mesh with pinions 7 on a cross shaft 8 mounted in the camera body and extending out through a side wall of the body and having an external knob or handle of conventional form, not shown. By turning the shaft 8, the pinions 7 will cause the gear segments 6 (one at each side of the camera) to move upwardly or downwardly as the case may be, thus likewise moving the rails or slides 2 and 4 and the lens carrier 1, to incline the optical axis upwardly or downwardly. This tilting arrangement is part of the preferred embodiment, but as already mentioned it is not an essential part of the present invention, since the focusing stop means of the present invention may also be used in a camera which does not have the upward and downward tilting feature.

For moving the lens carrier 1 forwardly and backwardly (sliding the rails 2 longitudinally on the rails or blocks 4) each of the rails 2 is provided with a rack member 9 having rack teeth projecting laterally from the surface of the rack member. Meshing with the rack teeth there are spiral ribs 10 arranged in an interrupted manner, as illustrated, on the face of a disk 11 fixed to a shaft 12. Preferably there is one of these disks 11 at each side of the camera body, for meshing with the rack teeth on the rack 9 on its side of the body.

The shaft 12 is approximately in alinement or coaxial with the pivotal axis 5, but preferably not exactly so. It is usually desirable to tilt the axis of the shaft 12 slightly forwardly, in a horizontal plane, relative to the tilting axis 5, so that only the spiral ribs 10 at the front edge of the disk 11 will make contact with the rack teeth on the member 9, while the spiral ribs at the rear edge of the disk 11 are slightly spaced laterally away from the teeth of the rack member 9.

Because of the relatively small pitch of the threading ribs or spiral ribs 10 on the disk 11, there is a very favorable transmission ratio in the focusing mechanism or gearing, so that very accurate fine focusing is possible. In other words, there is a very high transmission ratio between the rotation of the shaft 12, and the advance of the lens, so that the shaft 12 must turn through several complete revolutions in order to cover the entire focusing range, from one extreme or limit position to the other, that is, from infinity focus position to extreme closeup position. For limiting the turning of the shaft 12 and disk 11 in order to define accurately one or both of the extreme limit positions, there is provided the movable stop member 13 in the form of a lever for engaging a projection 14 on the focusing shaft 12. When speaking of the projection 14 as being "on" the shaft 12, it is to be understood that it need not be directly on the shaft itself; it may be on any part secured to the shaft to turn therewith, such as being on the manually operable focusing knob (not shown) or, as here illustrated, on the disk 11.

The stop lever 13 is pivoted on the pivot 17 on a fixed part of the camera body, to swing horizontally toward and away from the disk 11, in the directions of the double-headed arrow shown. When the lever 13 is swung counterclockwise to its leftward limit of motion, the free end of the lever is out of the path of travel of the projection 14 on the shaft 12, and thus the shaft may turn freely through as many revolutions as desired, without being hindered by the stop member 13. When the member 13 is swung slightly in a clockwise direction or rightwardly, then the free end of the lever lies in the path of travel of the projection 14, and stops further rotation of the shaft 12 when the projection 14 reaches the member 13.

For swinging the lever 13 between its effective and ineffective positions above described, the lever is provided with a pin 16 which engages a cam 15 mounted on or forming part of the slide rail 2. When the slide rail moves through the intermediate part of its longitudinal focusing motion, the action of the cam 15 on the pin 16 keeps the lever 13 swung to its ineffective position. When the slide rail 2 closely approaches its limit position in at least one direction (preferably in both directions) the cam 15 acts on the pin 16 to swing the stop lever 13 to its effective position, ready to engage the projection 14 at the proper moment, to stop the turning of the shaft 12 and thereby to determine with great exactness the limit position of the focusing mount 1, without causing any excessive pressure or undue stress on the spiral teeth 10 of the disk 11 or on the meshing teeth of the rack member 9, as might be the case of if the limit position were determined by a stop member engaging the lens carrier 1 or the rail 2, rather than the shaft 12.

The cam 15 may take various forms, within the skill of those familiar with cams, the form shown in the drawing being merely schematic. For example, it may be a box cam, that is, a groove engaging both sides of the pin 16, thus determining the position of the stop lever 13 in a positive sense, without requiring any spring. On the other hand, it may be a single faced cam engaging only one side of the pin 16, in which case a light restoring spring is used, tending to turn the lever 13 in a counterclockwise direction to keep the pin engaged with the surface of the cam.

It is to be understood that the disclosure is given by way of illustrative example only, rather than by way of limitation, and that without departing from the invention, the details may be varied within the scope of the appended claims. From what has been said above, it will be apparent to those skilled in the art that the invention is not limited to the particular type of focusing mechanism illustrated, but may be employed with other types of focusing gearing or drives, e.g., where the movement of the lens carrier from the focusing knob is effected by a rack and pinion. Also, a plurality of different projections 14 may be provided on the shaft 12, one for engaging the stop lever in one limit position and another for engaging the stop lever at the other limit position.

I claim:

1. A photographic camera comprising a lens carrier assembly movable through a range between respective limit positions for focusing, a rotary focusing member effective upon rotation to move said carrier assembly through said range, and a stop member for engaging said focusing member to limit rotation thereof in at least one direction, characterized by the fact that said stop member is mounted for movement between an effective position and an ineffective position, and that there is means controlled by movement of said lens carrier assembly for maintaining said stop member in its ineffective position while said lens carrier assembly is in an intermediate part of its range of movement and for shifting said stop member to its effective position as said lens carrier assembly approaches relatively close to one of its limit positions.

2. A construction as defined in claim 1, wherein said rotary focusing member turns through a plurality of complete revolutions in moving said carrier assembly through its complete range, and said stop member is ineffective to impede rotation of said focusing member during intermediate revolutions thereof and comes into cooperative relation to said rotary focusing member only during the last revolution of said rotary focusing member in at least one direction.

3. A construction as defined in claim 1, wherein said rotary focusing member has a projection mounted thereon and turning therewith, and wherein said stop member in its ineffective position lies out of the path of travel of said projection, and in its effective position lies in the path of travel of said projection to make contact therewith and thereby to limit rotation of said rotary focusing member.

4. A construction as defined in claim 3, wherein said stop member is in the form of a pivoted lever.

5. A construction as defined in claim 4, wherein movement of said pivoted lever is controlled by a cam associated with and movable with said lens carrier assembly.

6. A construction as defined in claim 1, wherein said lens carrier assembly includes a slide rail having a cam thereon for controlling movement of said stop member between its effective position and its ineffective position.

7. A construction as defined in claim 6, wherein said stop member is in the form of a pivoted lever having a pin thereon for engaging said cam and acting as a cam follower with respect to said cam.